Oct. 11, 1960

G. E. HENNING 2,955,968

METHODS OF MAKING COMPOSITE ELECTRICAL CONDUCTORS

Filed March 11, 1955

INVENTOR.
G. E. HENNING
BY
ATTORNEY

Oct. 11, 1960 G. E. HENNING 2,955,968
METHODS OF MAKING COMPOSITE ELECTRICAL CONDUCTORS
Filed March 11, 1955 2 Sheets-Sheet 2

INVENTOR.
G. E. HENNING
BY
ATTORNEY

United States Patent Office 2,955,968
Patented Oct. 11, 1960

2,955,968

METHODS OF MAKING COMPOSITE ELECTRICAL CONDUCTORS

George E. Henning, Baltimore, Md., assignor to Western Electric Company, Incorporated, New York, N.Y., a corporation of New York Filed Mar. 11, 1955, Ser. No. 493,723

2 Claims. (Cl. 154—2.27)

This invention relates to methods of making composite electrical conductors, and more particularly to methods of making composite electrical conductors embodying a large number of thin, alternate layers of electrically conductive material and dielectric material.

A recent development in the electrical communications art has been the discovery that improved transmission properties (e.g. reduction in attenuation) can be obtained in properly laminated conductors made up of a multiplicity of very thin, alternate, concentric layers of electrically conductive material and dielectric material. Heretofore, it has been the practice to fabricate such conductors by individually wrapping layers of thin metal foil longitudinally about a central core and interposing between successive layers of the metal foil, thin layers of a dielectric material. However, it has been found that laminated conductors made in this manner are not suited for fabrication on a mass production basis.

An object of this invention is to provide new and improved methods of making composite conductors.

Another object of this invention is to provide a new and improved method of making composite electrical conductors embodying a large number of thin, alternate layers of electrically conductive material and dielectric material.

A composite electrical conductor made by a method of the invention may include a tube formed from an initially flat, strip-like, laminated unit rolled about its longitudinal axis, said laminated unit comprising a plurality of thin alternate sheets of electrically conductive material and dielectric material in long strip form assembled one upon the other.

A method illustrating certain features of the invention may include assembling a plurality of sheets of electrically conductive material and dielectric material in long strip form alternately, one upon the other, to form an initially flat laminated unit, and forming the resulting laminated unit into a longitudinal tube.

A complete understanding of the invention may be had from the following detailed description of an improved composite electrical conductor and methods of making the same forming specific embodiments of the invention, when read in conjunction with the appended drawings, in which.

Figure 1:
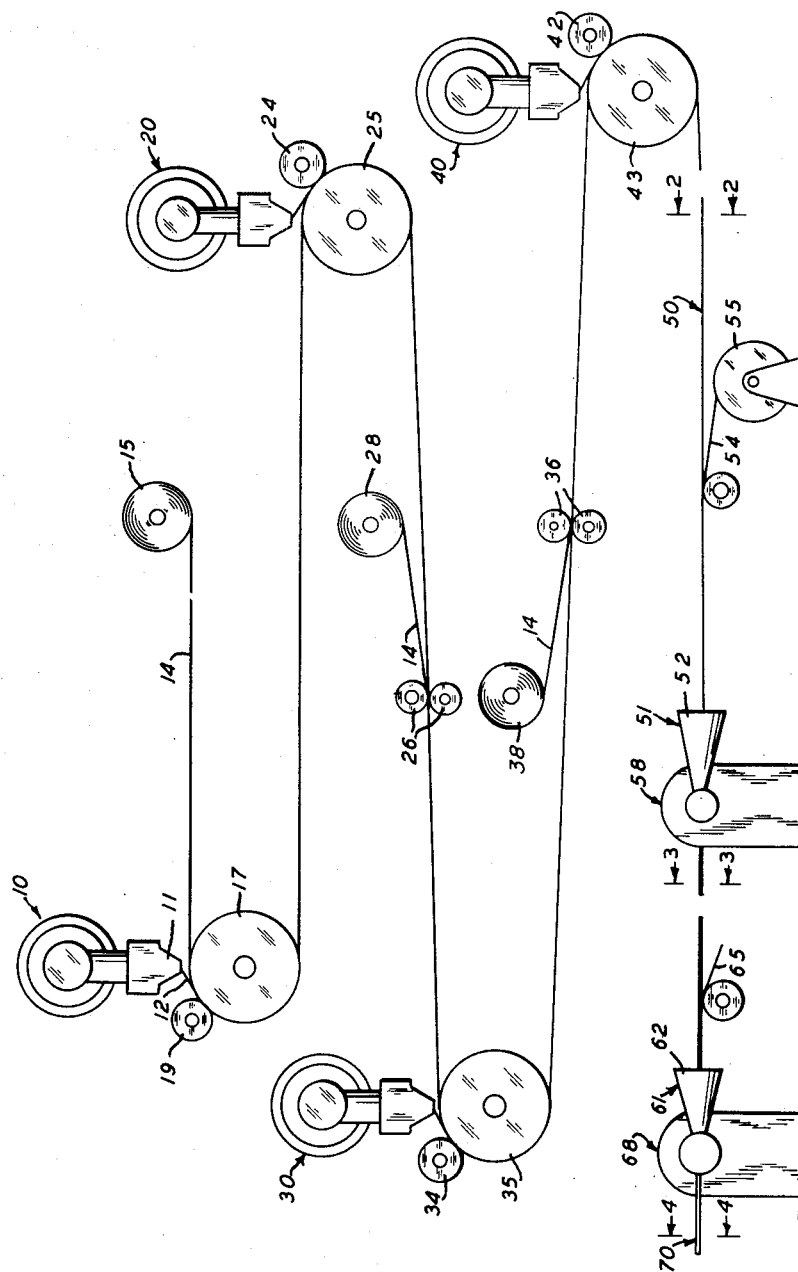
Fig. 1 is a schematic representation of apparatus for implementing a process for making such conductors.

Referring now in detail to the drawings, Fig. 1 shows apparatus that may be used to practice a process of fabricating composite laminated conductors embodying a large number of very thin, alternate layers of electrically conductive material and dielectric material. The apparatus includes a plastics extruder 10 designed to discharge a plastic insulating material, for example, polyethylene, or the like, into a heated, horizontal, sheeting die 11 which extrudes the plastic insulating material into a thin film 12.

Figure 2:
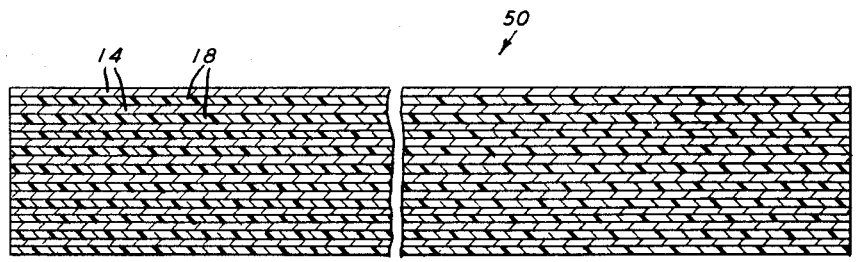
Fig. 2 is an enlarged, fragmentary, vertical section taken along line 2—2 of Fig. 1.

The extruded film 12 of the plastic insulating material is laminated directly onto a strip 14 of a very thin, electrically conductive, metal foil of copper, aluminum, or the like, which is advanced continuously at a predetermined constant linear speed from a supply 15 by a rotatably driven applicator drum 17. The extruded film 12 forms a very thin, flexible, insulating layer 18 (Fig. 2) having a predetermined thickness and width substantially equal to that of the metal foil strip 14.

A pressure roller 19 is urged resiliently toward the surface of the drum 17 and cooperates therewith to effect a firm bond between the insulating layer 18 and the metal foil strip 14. Suitable means (not shown) are provided for establishing optimum material temperatures in the region where the bonding is effected to facilitate the operation. The pressure roller 19 also functions to increase the traction of the drum 17 with respect to the metal foil strip 14.

After passing partly around the applicator drum 17, the composite laminated structure, consisting of the metal foil 14 and the insulating layer 18 bonded firmly thereto, travels directly to a plastics extruder 20. The extruder 20 is identical to the plastics extruder 10 and is designed similarly to apply another very thin, flexible, insulating layer 18 of the same plastic insulating material to the opposite side of the metal foil strip 14. The dimensions of the second insulating layer 18 are substantially identical to those of the first insulating layer 18.

A resiliently mounted pressure roller 24 cooperates with a rotatably driven applicator drum 25 to effect a firm bond between the second insulating layer 18 and the metal foil strip 14. Again the bonding is facilitated by suitable means (not shown) designed to established optimum material temperatures in the region where the bonding is effected.

After advancing partly around the applicator drum 25, the composite, laminated structure, which now consists of the metal foil strip 14 sandwiched between two insulating layers 18—18, passes between a pair of spring-pressed, cooperating, laminating rollers 26—26. The laminating rollers 26—26 are designed to apply another metal foil strip 14, which is advanced therebetween from a supply 28 to the exposed surface of one of the two insulating layers 18—18. Suitable means (not shown) are provided for heating the last-mentioned metal foil strip 14 to an optimum temperature to facilitate the bonding of this strip and the surface of the adjacent insulating layer 18.

The composite, laminated structure which emerges from between the laminating rollers 26—26 travels directly to a plastics extruder 30 which is identical to the plastics extruders 10 and 20, and is designed to apply another very thin, flexible, insulating layer 18 of the plastic insulating material to the exposed surface of the last-mentioned metal foil strip 14. As before, the bonding of the last-mentioned insulating layer 18 is facilitated by a pressure roller 34 which cooperates with a rotatably driven applicator drum 35.

After advancing partly around the applicator drum 35, the composite, laminated structure, which now consists of two metal foil strips 14—14 sandwiched between three insulating layers 18—18, passes between a pair of spring-pressed, cooperating, laminating rollers 36—36. The laminating rollers 36—36 are designed to apply an additional metal foil strip 14, which is advanced therebetween from a supply 38, to the exposed surface of one of the two outer insulating layers 18—18. Suitable means (not shown) are provided for heating the last-mentioned metal foil strip 14 to an optimum temperature to facilitate the bonding of this strip and the surface of the adjacent insulating layer 18.

Thereafter a plastics extruder 40, identical to the plastics extruders 10, 20 and 30, applies another insulating layer 18 to the exposed surface of the last-mentioned metal foil strip 14. The bonding of the applied insulating layer 18 is effected by cooperation between a pressure roller 42 and a rotatably driven applicator drum 43.

At this stage in the process a composite, laminated structure consisting of four very thin, flexible, uniform layers 18—18 of insulating material, interleaved with and bonded firmly to three very thin, uniform metal foil strips 14—14 of the same width as the insulating layers has been completed. For the purposes of this description it will be assumed that the process is continued in the manner hereinabove described until a laminated unit 50 (Fig. 2) is formed, which consists of $n$ insulating layers 18—18 interleaved with and bonded firmly to $n$ metal foil strips 14—14 (e.g. ten insulating layers and ten metal foil strips). Suitable apparatus (not shown) may be provided, if required, for trimming the edges from the laminated unit 50 to obtain a width of any desired dimension less than the original width.

Figure 3:
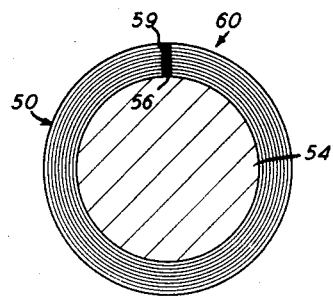
Fig. 3 is an enlarged, vertical section taken along line 3—3 of Fig. 1.

The laminated unit 50 is then advanced directly and continuously from the laminating apparatus, in which it has been fabricated, to tubulating apparatus 51 (Fig. 1) of a conventional design, including a forming cone 52. The laminated unit 50 is advanced through the forming cone 52 simultaneously with a solid core 54 of copper, aluminum, or the like, from a supply reel 55. The forming cone 52 forms the laminated unit 50 longitudinally into a concentric tube about the core 54 leaving a very narrow gap 56 (Fig. 3) between the adjoining edges thereof. Positioned at the exit end of the forming cone 52 is a sealing extruder 58 through which the tubularly formed, laminated unit 50 and the enclosed core 54 are advanced. The sealing extruder 58 is designed to fill the gap 56 with a longitudinal seam 59 of plastic insulating material, such as polyethylene or the like, so as to seal the tubularly formed, laminated unit 50 tightly about the core 55 to form a composite, laminated conductor 60 (Fig. 3).

Figure 4:
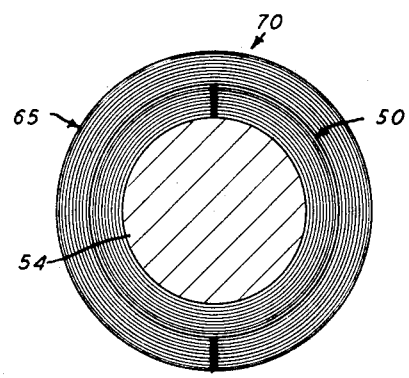
Fig. 4 is an enlarged, vertical section taken along line 4—4 of Fig. 1.

The laminated conductor 60 is then advanced directly into and through a second tubulating apparatus 61 (Fig. 1) of a conventional design, including a forming cone 62, which is designed to form a laminated unit 65 longitudinally into a concentric tube about the laminated conductor 60. The laminated unit 65 is fabricated in a continuous process substantially identical to that described previously in connection with the fabrication of the laminated unit 50. A sealing extruder 68 is located at the exit end of the forming cone 62 for the purpose of sealing the tubularly formed, laminated unit 65 tightly about the laminated conductor 60 to form a laminated conductor 70 (Fig. 4). It will be understood that the width of the laminated unit 65 should be somewhat greater than that of the laminated unit 50 due to the disparity between their mean radii when formed concentrically one upon the other.

Figure 5:
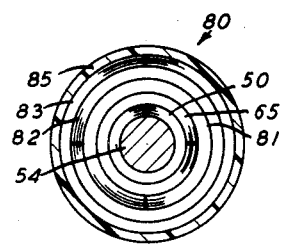
Fig. 5 is a vertical section of a finished laminated conductor.

Shown in Fig. 5 is a finished laminated conductor 80 produced by fabricating three additional laminated units 81, 82 and 83 and forming them successively one upon the other, in the manner hereinabove described, into concentric tubes about the laminated conductor 70. Assuming that there are ten insulating layers 18—18 and ten metal foil strips 14—14 in each of the laminated units 50. 65, 81, 82 and 83, the finished laminated conductor 80 comprises fifty concentric, tubular layers of conducting material interleaved with an equal number of concentric, tubular layers of dielectric material, which are arranged in five individually formed laminated units. As shown in Fig. 5, the sealed gaps between the edges of successive units are staggered. The conductor 80 has been provided with a relatively thick, extruded jacket 85 of a suitable plastic insulating and jacketing compound.

The term plastic insulating material as employed in the specification and appended claims will be understood to include any suitable thermosetting or thermoplastic, high dielectric strength, insulating compound which is capable of being formed into very thin, imperforate, flexible films and is capable of being bonded firmly to a strip of metal foil. In some applications it may be desirable to employ metal foils and dielectric films having thicknesses of the order of fractions of a mil. Manifestly the handling of such thin laminae is greatly simplified by practicing the above-described invention.

It is to be understood that the hereinabove described apparatus is disclosed merely by way of example for the purpose of illustration. Further, it is to be understood that the above-described embodiments of the invention are merely illustrative of the principles of the invention and that numerous modifications may be devised by those skilled in the art without departing from the spirit and scope of the invention.

What is claimed is:

1. A continuous process for manufacturing composite electrical conductors, which comprises the steps of advancing a strip of electrically conductive metal foil continuously along a predetermined path, successively extruding and bonding a continuous, impervious film of a plastic insulating material in strip form onto the continuously advancing metal foil strip, continuously bonding another continuous metal foil strip to the exposed face of the insulating film, continuously building a coherent unit laminate of an indefinite length having a predetermined width and composed of a predetermined number of alternate layers of metal foil and insulating film by further alternate film-extruding and bonding and the foil-bonding steps, continuously forming the thus-formed unit laminate about a longitudinal axis into a substantially cylindrical tube with contiguous edges of the unit laminate spaced apart to define a restricted longitudinal gap, filling the longitudinal gap with a plastic insulating material capable of sealing the edges of the unit laminate together and retaining the tubular shape, fabricating in the same manner at least one additional unit laminate, said additional units being of successively greater widths than the first-mentioned unit laminate, individually forming the additional unit laminates successively into concentric tubes about the first-mentioned tube with the contiguous edges of each of the additional unit laminates defining a restricted longitudinal gap, the gap so formed being staggered with respect to the gaps defined by immediately adjacent unit laminates, and successively filling the gaps with a plastic insulating material so that edges of each of the additional unit laminates are sealed and the tubular shape retained.

2. The process according to claim 1, including the additional step of extruding a continuous outer jacket of a plastic insulating material about the resulting concentric array of tubularly shaped unit laminates.

References Cited in the file of this patent

UNITED STATES PATENTS

| | | |
|---|---|---|
| 342,523 | Libbey | May 25, 1886 |
| 1,441,459 | Small | Jan. 9, 1923 |
| 1,763,755 | Bundy | June 17, 1930 |
| 1,844,512 | Mains | Feb. 9, 1932 |
| 1,958,281 | Scott | May 8, 1934 |
| 2,003,752 | Landt | June 4, 1935 |
| 2,131,478 | Mann | Sept. 27, 1938 |
| 2,177,266 | Schupp | Oct. 24, 1939 |
| 2,287,201 | Scott | June 23, 1942 |
| 2,426,904 | Tunnicliff et al. | Sept. 2, 1947 |
| 2,469,416 | Smyers | May 10, 1949 |
| 2,516,751 | Brown | July 25, 1950 |
| 2,565,634 | Taylor et al. | Aug. 28, 1951 |
| 2,715,595 | Prince | Aug. 16, 1955 |
| 2,722,637 | Brennan | Nov. 1, 1955 |

FOREIGN PATENTS

| | | |
|---|---|---|
| 686,408 | Great Britain | Jan. 21, 1953 |